US012738513B2

(12) United States Patent
Bosch et al.

(10) Patent No.: US 12,738,513 B2
(45) Date of Patent: Sep. 15, 2026

(54) GAS CONVEYING UNIT, SYSTEM CONSISTING OF A GAS CONVEYING UNIT AND A WATER SEPARATING DEVICE, AND FUEL CELL SYSTEM

(71) Applicant: Robert Bosch GmbH, Stuttgart (DE)

(72) Inventors: Timo Bosch, Renningen (DE); Tobias Falkenau, Esslingen (DE)

(73) Assignee: Robert Bosch GmbH, Stuttgart (DE)

(*) Notice: Subject to any disclaimer, the term of this patent is extended or adjusted under 35 U.S.C. 154(b) by 528 days.

(21) Appl. No.: 18/256,252

(22) PCT Filed: Nov. 22, 2021

(86) PCT No.: PCT/EP2021/082508
§ 371 (c)(1),
(2) Date: Jun. 7, 2023

(87) PCT Pub. No.: WO2022/128351
PCT Pub. Date: Jun. 23, 2022

(65) Prior Publication Data

US 2024/0021850 A1 Jan. 18, 2024

(30) Foreign Application Priority Data

Dec. 16, 2020 (DE) ..................... 10 2020 215 983.1

(51) Int. Cl.
*H01M 8/04* (2016.01)
*H01M 8/04014* (2016.01)
(Continued)

(52) U.S. Cl.
CPC ... *H01M 8/04164* (2013.01); *H01M 8/04014* (2013.01); *H01M 8/04291* (2013.01)

(58) Field of Classification Search
CPC . H01M 50/513; H01M 50/559; H01M 50/152
See application file for complete search history.

(56) References Cited

U.S. PATENT DOCUMENTS 9,692,066 B2 6/2017 Muetschele et al.
2010/0227238 A1 9/2010 Naganuma
(Continued)

FOREIGN PATENT DOCUMENTS

DE 102012221440 A1 6/2013
DE 102016115012 A1 2/2018
(Continued)

OTHER PUBLICATIONS

Translation of International Search Report for Application No. PCT/EP2021/082508 dated Mar. 10, 2022 (2 pages).

*Primary Examiner* — Olatunji A Godo
(74) *Attorney, Agent, or Firm* — Michael Best & Friedrich LLP

(57) ABSTRACT

The invention relates to a gas conveying unit (10) for conveying anode exhaust gas (A) of a fuel cell system, wherein the gas conveying unit (10) has a first flow inlet (11*a*) for admitting anode exhaust gas (A) into the gas conveying unit (10) and a flow outlet (12) for discharging anode exhaust gas (A) out of the gas conveying unit (10), wherein the first flow inlet (11*a*) can be fluidically connected to a first flow outlet (22a) of a water separating device (20), wherein a sensor device is provided for ascertaining a characteristic variable of the gas conveying unit (10), wherein said sensor device is paired with the gas conveying unit (10), wherein the gas conveying unit (10) comprises a controller, which is configured so as to evaluate sensor signals of the sensor device in order to ascertain the characteristic variable of the gas conveying unit (10) by means of a target value/actual value comparison and ascertain the fill level of the water separating device (20) on the basis of the ascertained characteristic variable of the gas conveying unit (10). The invention additionally relates to a system (40)
(Continued)

consisting of a gas conveying unit (10) and a water separating device (20) as well as to a fuel cell system.

10 Claims, 1 Drawing Sheet

(51) Int. Cl.
*H01M 8/04119* (2016.01)
*H01M 8/04291* (2016.01)

(56) References Cited

U.S. PATENT DOCUMENTS

| | | | | |
|---|---|---|---|---|
| 2014/0363480 | A1* | 12/2014 | Muetschele | H01M 8/04514 424/414 |
| 2017/0214069 | A1 | 7/2017 | Hoshi | |

FOREIGN PATENT DOCUMENTS

| | | | |
|---|---|---|---|
| DE | 102017202526 | A1 | 8/2018 |
| DE | 102017222390 | A1 | 6/2019 |
| JP | 2004095528 | A | 3/2004 |
| JP | 2010080434 | A | 4/2010 |
| JP | 2012174396 | A | 9/2012 |

* cited by examiner

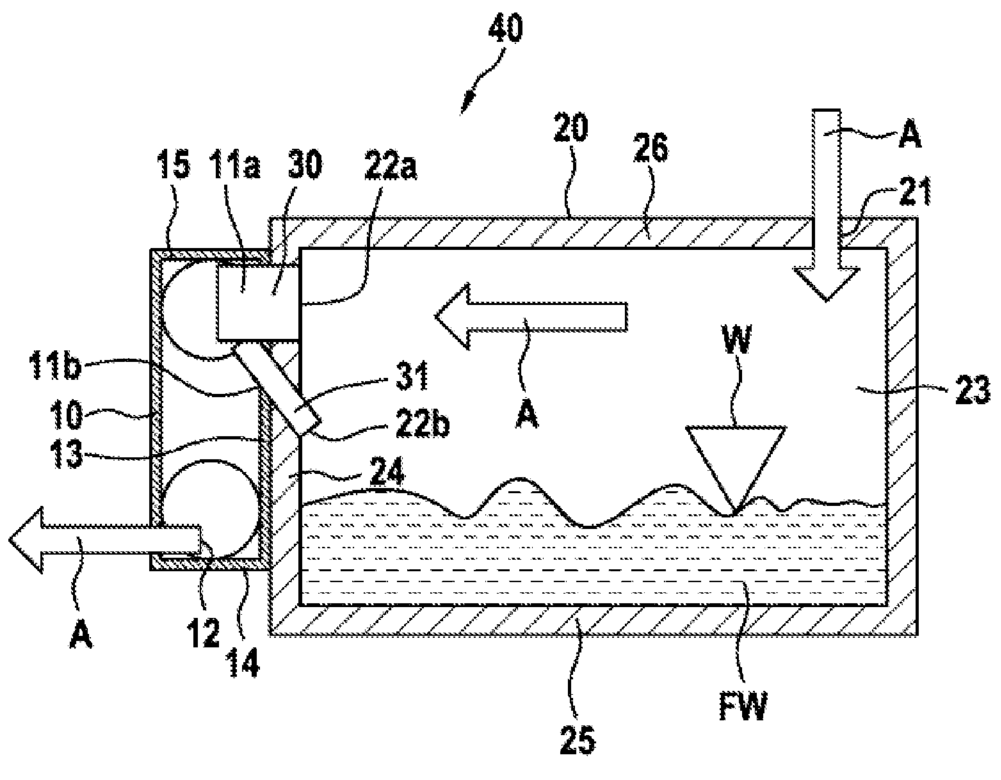
40
20
26
A
15
11a
30
22a
21
11b
31
W
23
10
22b
A
13
24
A
12
14
25
FW

GAS CONVEYING UNIT, SYSTEM CONSISTING OF A GAS CONVEYING UNIT AND A WATER SEPARATING DEVICE, AND FUEL CELL SYSTEM

BACKGROUND

Fuel cells are electrochemical energy converters in which process gases, often hydrogen and oxygen, e.g., from compressed ambient air, are converted into water, electrical energy, and heat. The process gases and coolants are directed into the fuel cell via a media supply. The fuel cell typically comprises two electrodes, an anode, and a cathode, which are separated from one another by means of an electrolyte, for example a membrane. The electrolyte provides the ion transport between the anode and the cathode. Such fuel cells are known, for example, as polymer electrolyte membrane (PEM) fuel cells.

Often, repeat units from multiple fuel cells are stacked into a fuel cell system in the form of a so-called stack. A cathode-side monopolar plate of a fuel cell comes into abutment with an anode-side monopolar plate of a fuel cell placed thereon. Two monopolar plates between two adjacent fuel cells together form a bipolar plate. The bipolar plates typically comprise channels for a coolant and for the process gases. Here, the individual fuel cells are typically arranged together in a sandwich-like manner. The fuel cell stack is bounded on both sides by two end plates. By means of a fuel cell stack, the generated electric voltage can in particular be increased.

To supply the process gases to a fuel cell system, the media supply comprises an anode supply and a cathode supply. The anode supply comprises an anode supply line for supplying anode gas to the fuel cell, an anode exhaust gas line for discharging anode exhaust gas from the fuel cell, and a recirculation line for recirculating anode exhaust gas. By means of the recirculation line, unconsumed hydrogen discharged from the fuel cell system can be re-fed into the fuel cell system as anode gas. Gas conveying units are preferably used in order to supply the still hydrogen-rich anode exhaust gas with fresh anode gas, in particular hydrogen, to the anode again. The cathode supply particularly comprises a cathode supply line for supplying cathode gas to the fuel cell and a cathode exhaust gas line for discharging cathode exhaust gas from the fuel cell.

During operation of the fuel cell system, product liquid water produced passes onto the anode sides of the fuel cells and eventually collects in the anode supply, in particular in the anode exhaust gas line and in particular in the gas conveying unit. The product liquid water can lead to damage to the gas conveying unit arranged in the recirculation line as well as to the blocking of flow paths. Therefore, on the anode side, a supply of anode exhaust gas without liquid water constituents is to be considered optimal.

It is therefore known to provide a water separating device or a water separator in the anode supply in order to largely separate the anode exhaust gas from the liquid water quantity. In particular, the water separating device is coupled to the gas conveying unit. In the water separating device, liquid water, which has been deposited from the anode exhaust gas, is temporarily stored in a reservoir of the water separating device. The liquid water collected can be discharged from the reservoir via a controllable valve for flow control. Thus, anode exhaust gas for the gas conveying unit can be provided by means of the water separating device, which is optimally completely separated from the liquid water quantity.

A conveying device for a fuel cell system for conveying and/or recirculating a gaseous medium, in particular hydrogen, with a recirculation fan, with a water separating device, with a jet pump driven by a driven jet of a pressurized gaseous medium, and with a dosing valve, is known from DE 10 2017 222 390 A1.

However, it has been found to be disadvantageous that liquid constituents or a quantity of liquid water can still exit the device depending on the point of operation of the fuel cell system and the separation efficiency of the water separating device. Liquid water can also be discharged from the water separating device when it overflows. In other words, the collected deposited liquid water can enter directly into the subsequent components, such as the gas conveying unit. Furthermore, waste heat losses of the anode exhaust gas can lead to the condensation of water and thus to the further generation of liquid water.

It is therefore known to use fill level sensors within the water separating device, which ascertain when a critical fill level of the reservoir is reached, and the valve for draining the liquid water can be opened. However, the measurement of the fill level sensors of condensing water can be compromised by waste heat losses of the anode exhaust gas, e.g., in the form of drops on the inner wall of the reservoir.

SUMMARY

The present invention relates to a gas conveying unit for a fuel cell system, as well as a system of a gas conveying unit and a water separating device and a fuel cell system.

Of course, features and details described in connection with the gas conveying unit according to the invention also apply in connection with the system according to the invention and the fuel cell system, and respectively vice versa, so that with respect to the disclosure, mutual reference to the individual aspects of the invention is or can always be made.

According to a first aspect, the present invention discloses a gas conveying unit for conveying anode exhaust gas of a fuel cell system, wherein the gas conveying unit has a first flow inlet for admitting anode exhaust gas into the gas conveying unit and a flow outlet for discharging anode exhaust gas out of the gas conveying unit, wherein the first flow inlet can be fluidically connected to a first flow outlet of a water separating device, wherein a sensor device is provided for ascertaining a characteristic variable of the gas conveying unit, wherein said sensor device is paired with the gas conveying unit, wherein the gas conveying unit comprises a controller, which is configured so as to evaluate sensor signals of the sensor device in order to ascertain the characteristic variable of the gas conveying unit by means of a target value/actual value comparison and ascertain the fill level of the water separating device on the basis of the ascertained characteristic variable of the gas conveying unit.

In particular, the gas conveying unit can be fluidically connected to the water separating device such that anode exhaust gas is directed from the water separating device out of the first flow outlet of the water separating device into the gas conveying unit via the first flow inlet of the gas conveying unit. By means of the water separating device, the quantity of liquid water of the anode exhaust gas can be reduced so that the efficiency of the gas conveying unit is not affected by liquid water in the anode exhaust gas.

The sensor device is preferably associated with or connected in a data-transmitting manner to the gas conveying unit. The sensor device can preferably be arranged in the gas conveying unit or externally. The sensor device can measure data regarding the characteristic variable of the gas conveying unit and pass this data on to the controller in the form of sensor signals. For this purpose, the controller is in particular connected to the sensor device in a data-transmitting manner. The controller is configured so as to receive and evaluate the sensor signals from the sensor device. The evaluation of the sensor signals is preferably carried out by means of a target value/actual value comparison. In particular, the sensor signals represent the actual value of the characteristic variable of the gas conveying unit. The controller is preferably associated with or connected in a data-transmitting manner to the gas conveying unit. The controller can be arranged externally or integrated into the gas conveying unit.

Preferably, the gas conveying unit according to the present invention can be used in any type of fuel cell system, wherein the number and configuration of the individual components of the fuel cell system are variably adjustable. Preferably, the gas conveying unit according to the present invention can be used for hydrogen-powered fuel cell systems. Furthermore, the gas conveying unit according to the invention can also be used for cathode exhaust gas or generally for process exhaust gas. The gas conveying unit according to the invention can also generally be used for conveying process gas, such as anode gas or cathode gas.

The invention has the advantage that, by means of the characteristic variable of the gas conveying unit, a reliable and precise detection of the fill level of the water separating device can be achieved. Preferably, the fill level of the water separating device can be inferred from the quantity of liquid water in the anode exhaust gas. In this case, a faulty determination of the fill level of the water separating device by means of fill level sensors within the water separating device due to condensing water can be avoided. Likewise, costs can be reduced, because there is no need for an additional level sensor within the water separating device. Furthermore, the gas conveying unit can be efficiently protected against a harmful quantity of liquid water, because, by precisely ascertaining the fill level of the water separating device, the collected liquid water in the water separating device can be purposefully discharged. A discharge of collected liquid water in the water separating device can therefore advantageously occur at targeted times and need not occur unnecessarily often or continuously. This increases the efficiency of a fuel cell system in which the gas conveying unit according to the invention is used, because, when liquid water is drained from the water separating device, it can otherwise occur that hydrogen is also discharged and is no longer be available as anode gas. A further advantage of the gas conveying unit according to the invention is the reduction of the mechanical system interfaces, because no further system intervention must occur, e.g., via an additional fill level sensor.

It is advantageously provided that the characteristic variable of the gas conveying unit is a temperature difference, wherein the sensor device comprises first and second temperature sensors, wherein the first temperature sensor is arranged at the first flow inlet of the gas conveying unit and wherein the second temperature sensor is arranged at the flow outlet of the gas conveying unit, and wherein the controller is configured so as to ascertain the fill level of the water separating device based on the temperature difference between the first and second temperature sensors. In other words, the first temperature sensor is provided at the first flow inlet of the gas conveying unit, which determines a first temperature of the anode exhaust gas, which enters the gas conveying unit at the first flow inlet. The second temperature sensor is provided at the flow outlet of the gas conveying unit in order to determine a second temperature of the anode exhaust gas exiting the gas conveying unit at the flow outlet. The temperature difference refers to the difference between the first and second temperatures.

In particular, due to its operation, the gas conveying unit transfers heat into the conveyed anode exhaust gas, because the preferably electrically operated gas conveying unit generates waste heat when pumping. A portion of this waste heat is transferred into the conveyed anode exhaust gas by dissipation. In an ideal case, in particular, the water separating device has a maximum separation efficiency, such that the anode exhaust gas at the first flow inlet into the gas conveying unit can have a relative humidity of 100%. In other words, the anode gas has a maximum quantity of water vapor, and it already carries with it the energy required for the vaporization of water. When this anode exhaust gas enters the gas conveying unit in the first flow inlet, the anode exhaust gas in particular receives additional heat through the resulting waste heat in the gas conveying unit, for which reason the temperature of the anode exhaust gas increases. In other words, this temperature increase of the anode exhaust gas can be determined as the temperature difference between the first and second temperature sensors.

In particular, if there is no temperature increase of the anode exhaust gas via the gas conveying unit, i.e., between the first flow inlet and the flow outlet, too much liquid water at the first flow inlet of the gas conveying unit can be inferred due to the isothermic process of vaporization. In particular, the waste heat of the gas conveying unit is used in order to evaporate the liquid water of the anode exhaust gas within the gas conveying unit, and the temperature of the anode exhaust gas cannot increase further. In this case, the temperature difference between the first and second temperature sensors is equal to zero. By measuring the temperature or a temperature difference by means of the sensor device, the fill level of the water separating device can thus be ascertained, in particular based on the quantity of liquid water of the anode exhaust gas. In other words, depending on the configuration of the sensor device, a characteristic fill level of the water separating device is ascertained.

Preferably, it can be provided that the characteristic variable of the gas conveying unit is a speed of the gas conveying unit, wherein the sensor device is configured as a speed sensor integrated into the gas conveying unit, and wherein the controller is configured so as to ascertain the fill level of the water separating device based on a difference compared to a target speed of the gas conveying unit. As is known, the output of the gas conveying unit is proportional to the speed of the gas conveying unit. However, due to construction, the gas conveying unit can more easily realize a target speed with a lesser amount of liquid water in the anode exhaust gas at the first flow inlet. In other words, the more liquid water is present in the anode exhaust gas, the speed of the gas conveying unit decreases with consistent output. Stated differently, the speed of the gas conveying unit at consistent output is inversely proportional to the quantity of liquid water of the anode exhaust gas. By means of the speed sensor, an actual speed of the gas conveying unit can be determined and the controller can ascertain the fill level of the water separating device by means of the target value/actual value comparison between the actual speed and the target speed via the difference to the target speed. This can in particular be ascertained via the quantity of liquid water carried along in the anode exhaust gas, which can reduce the speed at a consistent output.

Particularly preferably, it can be provided that the characteristic variable of the gas conveying unit is an output difference of the gas conveying unit, wherein the sensor device is configured as an output sensor integrated in the gas conveying unit, and wherein the controller is configured so as to ascertain the fill level of the water separating device based on a difference compared to a target output of the gas conveying unit. By way of example, a recurring output difference can thus also be monitored over time. The output sensor of the gas conveying unit can determine or measure an actual output of the gas conveying unit. In particular, an output without liquid water can be stored in the controller as the target output. The electrical output or output consumption of the gas conveying unit scales with the liquid water quantity at a defined consistent speed. Based on an increase in the output consumption, i.e., an existing difference between the target output and the actual output, an increase in the liquid water quantity can thus be concluded and a fill level of the water separating device ascertained based on this. This has the advantage that it can be avoided that the gas conveying unit reaches its limits due to an excessive quantity of liquid water.

Further, it can be preferably provided that the first flow inlet of the gas conveying unit is connectable directly to the first flow outlet of the water separating device for forming a first flow path of anode exhaust gas from the water separating device into the gas conveying unit, wherein the first flow inlet of the gas conveying unit is arranged at the top of the gas conveying unit opposite the direction of gravity. In other words, the gas conveying unit and the water separating device are fluidically connected to one another at a highest possible point of the gas conveying unit and the water separating device. This has the advantage that it can be ensured that the collected liquid water of the water separating device cannot spill into the gas conveying unit. For example, when using the gas conveying unit and the water separating device in a fuel cell system in a motor vehicle, it can further be ensured that no liquid water can enter the gas conveying unit by sloshing when the motor vehicle is traveling in real-world conditions.

Particularly preferably, it is provided that, in the direction of gravity below the first flow inlet of the gas conveying unit, the gas conveying unit comprises a second flow inlet which is connectable to a second flow outlet of the water separating device in order to form a second flow path of anode exhaust gas from the water separating device into the gas conveying unit. In other words, the second flow path is arranged below the first flow path. This means that the second flow inlet of the gas conveying unit is arranged below the first flow inlet of the gas conveying unit. Accordingly, the second flow outlet of the water separating device is arranged below the first flow outlet of the water separating device. The second flow path illustratively represents a fill level bore. In the operation of the gas conveying unit, the gas conveying unit can draw in anode exhaust gas, in particular including liquid water within the anode exhaust gas, via the second flow path. In particular, liquid water can enter the gas conveying unit via the second flow path when the fill level of the water separating device is above the second flow path. The use of a second flow path has the advantage that the determination of the characteristic variable of the gas conveying unit, as set forth above, in particular regarding the temperature, speed, or output of the gas conveying unit, can be combined with and thus optimized with the structural addition of the second flow path. In particular, even at a low fill level of the water separating device, it can be detected via the determination of the characteristic size of the gas conveying unit, and the liquid water of the water separating device can be discharged via the valve as needed. By way of example, a third temperature sensor can be provided at the second flow inlet of the gas conveying unit, which can determine an additional temperature of the anode exhaust gas entering the gas conveying unit at the second flow inlet. Thus, the determination of the characteristic variable of the gas conveying unit described above can be further improved by means of the temperature difference.

It can further be preferably provided that the second flow path is chamfered with respect to the first flow path such that a flow of liquid water from the water separating device into the gas conveying unit can be restricted. In particular, the first flow path and the second flow path can form an acute angle, preferably between 10° and 80°. Preferably, the second flow path is configured such that a minimum quantity of liquid water can be drawn in from the water separating device. This has the particular advantage that the liquid water in the water separating device or the fill level of the water separating device can thus be reliably detected. Further, the second flow path can also be configured such that the flow of liquid water from the water separating device into the gas conveying unit is limited to a set minimum value. Overall, the advantage can be achieved that, by means of the second flow path, the gas conveying unit can be efficiently protected against a critical quantity of liquid water from the water separating device. It should further be noted that any desired number of flow paths can be provided, i.e., a third flow path, for example.

According to a second aspect, the present invention discloses a system comprising a gas conveying unit according to any of the preceding embodiments and a water separating device, wherein the water separating device comprises a reservoir for collecting deposited liquid water from an anode exhaust gas and a controllable valve for flow control of collected liquid water from the reservoir, wherein the water separating device is coupled to the gas conveying unit such that the first flow outlet of the water separating device is connected to the first flow inlet of the gas conveying unit. The system according to the invention, comprising the gas conveying unit and the water separating device, therefore has the same features and advantages as the gas conveying unit according to the invention.

It can preferably be provided that the water separating device comprises a second flow outlet connected to a second flow inlet of the gas conveying unit.

Furthermore, it can be preferably provided that the valve for flow control is controllable by means of the controller of the gas conveying unit depending on the particular characteristic variable of the gas conveying unit. Thus, the water separating device can be emptied when the maximum fill level is reached as well as depending on the operating point, thereby efficiently protecting the gas conveying unit against liquid water.

According to a third aspect, the present invention discloses a fuel cell system comprising at least one fuel cell having an anode and a cathode, wherein an electrolyte is arranged between the anode and the cathode, wherein the fuel cell system further comprises an anode supply having an anode supply line for supplying anode gas to the fuel cell, an anode exhaust gas line for discharging anode exhaust gas from the fuel cell, and a recirculation line for recirculating anode exhaust gas, wherein the anode supply comprises at least one system according to the invention. The fuel cell system according to the invention thus comprises the gas conveying unit according to the invention and the water separating device and therefore comprises the same features and advantages as the gas conveying unit according to the invention.

The fuel cell system can be used in a motor vehicle, such as a passenger vehicle or a commercial truck, to generate electrical energy for driving the motor vehicle, in particular for driving an electric drive motor of the motor vehicle. In order to generate the electrical energy in the fuel cell system, further system modules are necessary, for example among others a media supply module for supplying the fuel cell system in or on the vehicle.

Further measures improving the invention arise from the following description of an embodiment example of the invention, which is schematically illustrated in the drawing. All of the features and/or advantages arising from the claims, description, or drawing, including structural details, spatial arrangements, and method steps can be essential to the invention, both by itself and in the various combinations. Note that the FIGURE is of a descriptive nature only and is not intended to limit the invention in any way.

BRIEF DESCRIPTION OF THE DRAWING

The FIGURES show schematically:

FIG. 1 a schematic view of an embodiment example of a system according to the invention consisting of a gas conveying unit and a water separating device for a fuel cell system.

DETAILED DESCRIPTION

FIG. 1 shows a schematic view of an embodiment example of a system 40 according to the invention consisting of a gas conveying unit 10 for conveying anode exhaust gas A and a water separating device 20 for a fuel cell system (not shown). For example, the system 40 can be arranged in a recirculation line of an anode supply of the fuel cell system (not shown). The water separating device 20 comprises a reservoir 23 for collecting deposited liquid water LW from an anode exhaust gas A and a controllable valve (not shown) for the flow control of collected liquid water LW from the reservoir 23.

By way of example, a flow inlet 21 for anode exhaust gas A of the fuel cell system is arranged on a ceiling region 26 of the reservoir 23 of the water separating device 20. Through the flow inlet 21, anode exhaust gas A can enter the reservoir 23 or into the water separating device 20 in the direction of the arrow. During operation of the fuel cell system, product liquid water produced passes onto the anode sides of the fuel cells and eventually collects in the anode supply. As a result, anode exhaust gas A entering the water separating device 20 at the flow inlet 21 can carry liquid water constituents. Within the reservoir 23 of the water separating device 20, the anode exhaust gas A flows in the direction of a side wall 24 of the reservoir 23 of the water separating device 20, at which a first flow outlet 22*a* is arranged. In so doing, water W can be deposited in the direction of a floor region 25 of the reservoir 23 of the water separating device in the direction of gravity. In the floor region 25 of the reservoir 23 of the water separating device 25, liquid water LW thereby collects. This can in particular be discharged by the controllable valve (not shown). The water separating device 20 comprises a second flow outlet 22*b*, by way of example on the side wall 24 of the reservoir 23. The second flow outlet 22*b* is arranged below the first flow outlet 22*a*. From the first flow outlet 22*a* and second flow outlet 22*b*, anode exhaust gas A can exit the water separating device 20. Furthermore, by way of example, the first flow outlet 22*a* is arranged at the top of the side wall 24 in the ceiling region 26 of the reservoir 23 of the water separating device 20, counter to the direction of gravity.

The water separating device 20 is connected to the gas conveying unit 10. The gas conveying unit 10 comprises a ceiling region 15, a floor region 14, and a side wall 13, for example, wherein the side wall 13 faces the side wall 24 of the water separating device 20. A first flow inlet 11*a* and a second flow inlet 11*b* are arranged on the side wall 13 of the gas conveying unit 10. The second flow inlet 11*b* is arranged below the first flow inlet 11*a*. The first flow inlet 11*a* is arranged at the top of the side wall 13, counter to the direction of gravity.

In particular, the water separating device 20 is coupled to the gas conveying unit 10 such that the first flow outlet 22*a* of the water separating device 20 is directly fluidically connected to the first flow inlet 11*a* of the gas conveying unit 10. For example, the first flow inlet 11*a* and the first flow outlet 22*a* are arranged at the same height on the associated side wall 13, 24. Furthermore, by way of example, the second flow outlet 22*b* of the water separating device 20 is fluidically connected to the second flow inlet 11*b* of the gas conveying unit 10. By connecting the first flow inlet 11*a* of the gas conveying unit 10 to the first flow outlet 22*a* of the water separating device 20, a first flow path 30 is formed. In the first flow path 30, anode exhaust gas A flows from the water separating device 20 into the gas conveying unit 10. By connecting the second flow inlet 11*b* of the gas conveying unit 10 to the second flow outlet 22*b* of the water separating device 20, a second flow path 31 is formed. In the second flow path 31, anode exhaust gas A flows from the water separating device 20 into the gas conveying unit 10. In the gas conveying unit 10, the anode gas A is conducted in the direction of a flow outlet 12 of the gas conveying unit 10, for example in the floor region 14 of the gas conveying unit 10. The anode exhaust gas A exits the gas conveying unit 10 from the flow outlet 12.

The second flow path 31 illustratively represents a fill level bore. In the operation of the fuel cell system, the gas conveying unit 10 can draw in anode exhaust gas A, in particular including liquid water LW within the anode exhaust gas A, via the second flow path 31. In particular, liquid water LW can enter the gas conveying unit 10 via the second flow path 31 when the fill level of the water separating device 20 is above the second flow path 31.

Furthermore, it is provided by way of example that the second flow path 31 is chamfered with respect to the first flow path 30 such that a flow of liquid water LW from the water separating device 20 into the gas conveying unit 10 is restricted. In particular, the first flow path 30 and the second flow path 31 form an acute angle. In other words, therefore, a distance between the first flow outlet 22*a* and the second flow outlet 22*b* at the side wall 24 of the reservoir 23 of the water separating device 20 is greater than a distance between the first flow inlet 11*a* and the second flow inlet 11*b* at the side wall 13 of the gas conveying unit 10.

Furthermore, a sensor device (not shown) for ascertaining a characteristic variable of the gas conveying unit 10 is associated with the gas conveying unit 10 or is connected to the gas conveying unit 10 in a data-transmitting manner. The gas conveying unit 10 further comprises a controller (not shown), which is configured so as to evaluate sensor signals of the sensor device for ascertaining the characteristic variable of the gas conveying unit 10 by means of a target value/actual value comparison and to ascertain a fill level of the water separating device 20 based on the particular characteristic variable of the gas conveying unit 10.

In so doing, the sensor device can measure data regarding the characteristic variable of the gas conveying unit 10 and pass this data on to the controller in the form of sensor signals. For this purpose, the controller is in particular connected to the sensor device in a data-transmitting manner. The controller is configured so as to receive and evaluate the sensor signals from the sensor device. The evaluation of the sensor signals is preferably carried out by means of a target value/actual value comparison. The controller is preferably associated with the gas conveying unit 10 or connected in a data-transmitting manner to the gas conveying unit 10.

By way of example, the characteristic variable of the gas conveying unit 10 is configured as a temperature difference, wherein the sensor device comprises first and second temperature sensors, wherein the first temperature sensor is arranged at the first flow inlet 11*a* of the gas conveying unit 10 and wherein the second temperature sensor is arranged at the flow outlet 12 of the gas conveying unit 10, and wherein the controller is configured so as to ascertain the fill level of the water separating device 20 based on the temperature difference between the first and second temperature sensors. In other words, the first temperature sensor is provided at the first flow inlet 11*a* of the gas conveying unit 10, which determines a first temperature of the anode exhaust gas A, which enters the gas conveying unit 10 at the first flow inlet 11*a*. The second temperature sensor is provided at the flow outlet 12 of the gas conveying unit 10 in order to determine a second temperature of the anode exhaust gas A exiting the gas conveying unit 10 at the flow outlet 12. The temperature difference refers to the difference between the first and second temperatures.

Alternatively, a third temperature sensor can be provided at the second flow inlet of the gas conveying unit, which can determine an additional temperature of the anode exhaust gas entering the gas conveying unit at the second flow inlet. Thus, the determination of the characteristic variable of the gas conveying unit described above can be further improved by means of the temperature difference.

In particular, if there is no temperature increase of the anode exhaust gas A via the gas conveying unit 10, i.e. between the first flow inlet 11*a* and the flow outlet 12, too much liquid water LW at the first flow inlet 11*a* of the gas conveying unit 10 can be inferred due to the isothermic process of vaporization. In particular, the waste heat of the gas conveying unit 10 is used in order to evaporate the liquid water LW of the anode exhaust gas A within the gas conveying unit 10, and the temperature of the anode exhaust gas A cannot increase further. In this case, the temperature difference between the first and second temperature sensors is equal to zero. By measuring the temperature or a temperature difference by means of the sensor device, the fill level of the water separating device 20 can thus be ascertained, in particular based on the quantity of liquid water of the anode exhaust gas A. Thus, the overall advantage can be achieved that a precise and reliable determination of the fill level of the water separating device 20 can be enabled, wherein, based on this, the liquid water LW in the reservoir 23 of the water separating device 20 can be selectively discharged so that a harmful liquid water quantity that can enter the gas conveying unit 10 can be efficiently reduced.

The invention claimed is:

1. A gas conveying unit (10) for conveying anode exhaust gas (A) of a fuel cell system, the gas conveying unit (10) comprising:

a first flow inlet (11*a*) for admitting anode exhaust gas (A) into the gas conveying unit (10);

a flow outlet (12) for discharging anode exhaust gas (A) out of the gas conveying unit (10), wherein the first flow inlet (11*a*) can be fluidically connected to a first flow outlet (22*a*) of a water separating device (20); and a sensor device paired with the gas conveying unit (10), wherein the gas conveying unit (10) comprises a controller, which is configured to;

evaluate sensor signals of the sensor device in order to determine a characteristic variable of the gas conveying unit (10) by means of a target value/actual value comparison, wherein the characteristic variable of the gas conveying unit (10) represents an operating behavior of the gas conveying unit (10) during conveyance of anode exhaust gas, and determine a fill level of the water separating device (20) on the basis of the determined characteristic variable of the gas conveying unit (10).

2. The gas conveying unit (10) according to claim 1, wherein the characteristic variable of the gas conveying unit (10) is a temperature difference, wherein the sensor device comprises first and second temperature sensors, wherein the first temperature sensor is arranged at the first flow inlet (11*a*) of the gas conveying unit (10) and wherein the second temperature sensor is arranged at the flow outlet (12) of the gas conveying unit (10), and wherein the controller is configured to determine the fill level of the water separating device (20) based on the temperature difference between the first and second temperature sensors.

3. The gas conveying unit (10) according to claim 1, wherein the characteristic variable of the gas conveying unit (10) is a speed of the gas conveying unit (10), wherein the sensor device is configured as a speed sensor integrated into the gas conveying unit (10), and wherein the controller is configured to determine the fill level of the water separating device (20) based on a difference compared to a target speed of the gas conveying unit (10).

4. The gas conveying unit (10) according to claim 1, wherein the characteristic variable of the gas conveying unit (10) is an output difference of the gas conveying unit (10), wherein the sensor device is configured as an output sensor integrated in the gas conveying unit (10), and wherein the controller is configured to determine the fill level of the water separating device (20) based on a difference compared to a target output of the gas conveying unit (10).

5. The gas conveying unit (10) according to claim 1, wherein in order to form a first flow path (30) of anode exhaust gas (A) from the water separating device (20) into the gas conveying unit (10), the first flow inlet (11*a*) of the gas conveying unit (10) is directly connectable to the first flow outlet (22*a*) of the water separating device (20), wherein the first flow inlet (11*a*) of the gas conveying unit (10) is arranged at the top of the gas conveying unit (10) opposite the direction of gravity.

6. The gas conveying unit (10) according to claim 5, wherein in the direction of gravity below the first flow inlet (11*a*) of the gas conveying unit (10), the gas conveying unit (10) comprises a second flow inlet (11*b*) which is connectable to a second flow outlet (22*b*) of the water separating device (20) in order to form a second flow path (31) of anode exhaust gas (A) from the water separating device (20) into the gas conveying unit (10).

7. The gas conveying unit (10) according to claim 6, wherein the second flow path (31) is chamfered with respect to the first flow path (30) such that a flow of liquid water (LW) from the water separating device (20) into the gas conveying unit (10) can be restricted.

8. A system (40) comprising a gas conveying unit (10) having a first flow inlet (11*a*) for admitting anode exhaust gas (A) into the gas conveying unit (10);

a flow outlet (12) for discharging anode exhaust gas (A) out of the gas conveying unit (10), wherein the first flow inlet (11*a*) can be fluidically connected to a first flow outlet (22*a*) of a water separating device (20);

a sensor device paired with the gas conveying unit (10), wherein the gas conveying unit (10) comprises a controller, which is configured to evaluate sensor signals of the sensor device in order to determine the characteristic variable of the gas conveying unit (10) by means of a target value/actual value comparison and determine a fill level of the water separating device (20) on the basis of the determined characteristic variable of the gas conveying unit (10), wherein the characteristic variable of the gas conveying unit (10) represents an operating behavior of the gas conveying unit (10) during conveyance of anode exhaust gas; and a water separating device (20), wherein the water separating device (20) comprises a reservoir (23) for collecting deposited liquid water (LW) from an anode exhaust gas (A) and a controllable valve for flow control of collected liquid water (LW) from the reservoir (23), wherein the water separating device (20) is coupled to the gas conveying unit (10) such that the first flow outlet (22*a*) of the water separating device (20) is connected to the first flow inlet (11*a*) of the gas conveying unit (10).

9. The system (40) according to claim 8, wherein the valve for flow control is controllable by means of the controller of the gas conveying unit (10) depending on the characteristic variable of the gas conveying unit (10).

10. A fuel cell system comprising at least one fuel cell having an anode and a cathode, wherein an electrolyte is arranged between the anode and the cathode, wherein the fuel cell system further comprises an anode supply having an anode supply line for supplying anode gas to the fuel cell, an anode exhaust gas line for discharging anode exhaust gas (A) from the fuel cell, and a recirculation line for recirculating anode exhaust gas (A), wherein the anode supply comprises at least one system (40) according to claim 8.

* * * * *